United States Patent

Gustafsson

(10) Patent No.: US 6,506,425 B2
(45) Date of Patent: Jan. 14, 2003

(54) PACKAGED MARKABLE INGESTIBLE COMPRESSIBLE OBJECT

(75) Inventor: Stig Gustafsson, Helsingborg (SE)

(73) Assignee: Pharmacia AB, Helsingborg (SE)

(*) Notice: Subject to any disclaimer, the term of this patent is extended or adjusted under 35 U.S.C. 154(b) by 0 days.

(21) Appl. No.: 09/966,073

(22) Filed: Oct. 1, 2001

(65) Prior Publication Data

US 2002/0009523 A1 Jan. 24, 2002

Related U.S. Application Data

(62) Division of application No. 09/643,718, filed on Aug. 23, 2000, now abandoned, which is a division of application No. 09/043,026, filed as application No. PCT/SE96/01027 on Aug. 20, 1996, now Pat. No. 6,129,936.

(30) Foreign Application Priority Data

Sep. 13, 1995 (SE) .............................. 9503154-8

(51) Int. Cl.[7] ...................... B65D 85/00; A23L 1/00; A23G 3/30
(52) U.S. Cl. ............................ 426/5; 426/87; 426/112; 424/440; 424/48
(58) Field of Search .................... 426/5, 383, 87, 426/414, 104, 112; 53/122, 428; 425/385; 264/293; 249/140; 424/440, 48

(56) References Cited

U.S. PATENT DOCUMENTS

| | | | |
|---|---|---|---|
| 211,318 A | 1/1879 | Burchard | |
| 321,216 A | 6/1885 | Hawley et al. | |
| 560,202 A | 5/1896 | Fielding | |
| 605,120 A | 6/1898 | Nathan | |
| 627,625 A | 6/1899 | Nathan | |
| 1,891,230 A | 12/1932 | Harnden | |
| 1,991,617 A | 2/1935 | Krein | |
| 2,159,997 A | 5/1939 | Millar | |
| 2,235,964 A | 3/1941 | Meyer et al. | |
| 2,291,672 A | 8/1942 | Youngberg | |
| 2,370,925 A | 3/1945 | Wade | |
| 2,484,842 A | 10/1949 | McDonell | |
| 2,688,775 A | 9/1954 | Scherer et al. | |
| 3,215,536 A | 11/1965 | Simeone et al. | |
| 3,253,929 A | 5/1966 | Peters | |
| 3,303,796 A | 2/1967 | Novissimo | |
| 3,410,699 A | 11/1968 | Peters | |
| 3,936,384 A | 2/1976 | Williams | |
| 4,001,440 A | 1/1977 | Hoyt | |
| 4,111,624 A | 9/1978 | Hanson | |
| 4,168,321 A | 9/1979 | Okamoto | |
| 4,397,871 A | 8/1983 | Meyer et al. | |
| 4,455,320 A | 6/1984 | Syrmis | |
| 4,525,373 A | 6/1985 | Hosaka | |
| 4,882,176 A | 11/1989 | Koyama et al. | |
| 5,457,895 A | * 10/1995 | Thompson et al. | |
| 5,538,742 A | 7/1996 | McHale et al. | |

FOREIGN PATENT DOCUMENTS

| | | |
|---|---|---|
| AU | 645730 | 11/1992 |
| CA | 2057985 | 6/1993 |
| DE | 2637519 | 2/1978 |
| GB | 439534 | 12/1935 |
| JP | 6062948 | 4/1985 |
| JP | 6112242 | 1/1986 |
| JP | 6128349 | 2/1986 |
| JP | 61192251 | 8/1986 |
| JP | 1309652 | 12/1989 |

\* cited by examiner

*Primary Examiner*—Steve Weinstein
(74) *Attorney, Agent, or Firm*—Birch, Stewart, Kolasch & Birch, LLP

(57) ABSTRACT

Method for marking an object where the object is placed in a package whereby a pattern in said package is caused to make a marking in said object. Objects being marked with the above method. The invention is especially useful for marking solid or semi-solid formulations of drugs, candy and food-stuff. Specifically the invention is useful to mark nicotine-containing chewing gums. Other solid or semi-solid objects can equally well be marked using the present invention.

17 Claims, 3 Drawing Sheets

PACKAGED MARKABLE INGESTIBLE COMPRESSIBLE OBJECT

This application is a divisional application of Ser. No. 09/643,718 filed Aug. 23, 2000, now abandoned, which is a divisional application of Ser. No. 09/043,026, filed May 11, 1998, now U.S. Pat. No. 6,129,936, which is a 371 of PCT/SE96/01027, filed Aug. 20, 1996.

This invention relates to a novel and inventive method for marking objects and to objects being marked with such method. The invention is especially useful for marking solid or semi-solid formulations of drugs, candy and food-stuff. Specifically the invention is useful to mark nicotine-containing chewing gums. Other solid or semi-solid objects, edible or non-edible, can equally well be marked using the present invention.

BACKGROUND

Many objects need to be marked in order to be identified or be distinguished from other similar objects. Often it is not sufficient to identify the object by information on the package in which the object is placed—if a package is used. When the package is taken away there is no identification left about the object. Examples of such objects include drugs in solid or semi-solid form, such as pills, capsules and chewing-gums. Solid drugs having a hard texture or being coated as to obtain a hard surface may be marked using e.g., a laser printing technique. Successful printing requires that the surface of the object does not absorb the printing dye in such a way that it spreads and renders the printed message illegible. Some solid drug formulations might also be marked through stamping or impressing. This technique requires that the texture of the object is such that the object does not stick to the stamping/impressing device and that the stamped/impressed marking will not fade due to the object resuming its prior appearance. Both the printing and the stamping/impressing methods further require that the objects to be marked may be easily and precisely positioned during the marking operation in order to achieve consistent and legible marking. Some objects might be molded into their final shapes thereby simultaneously achieving a marking in the form of a depression or raising. Anyhow there are very specific requirements, as to defined melting points, non-sensitivity to heat etc, on compositions being suitable for molding, excluding many compositions from being mouldable.

One example of objects which cannot be marked either by using any one of the above methods or with any other known technique is nicotine-containing chewing gums used for smoking cessation purposes. Such gums are semi-solid, are not possible to obtain through e.g. molding, but are obtained through extruding and subsequent cutting to final shapes, have no hard surface texture or coating, would spread a dye marking applied to the surface, and are difficult to handle due to a certain stickiness which also cause problems if a normal stamping/impressing operation should be tried. Said chewing gums are disclosed in U.S. Pat. No. 3,845,217, hereby incorporated by reference, and are marketed under the trade marks Nicorette® and Nicotrol®. Hitherto these chewing gums have been sold in blister packages, having information printed thereon, without any marking on the gums themselves. Anyhow governmental authorities, such as the Food and Drug Administration in USA, are likely to require marking also on such therapeutic chewing gums as they already do for many other drugs in solid form.

Except for chewing gums also other edibles, such as candy and certain food-stuff, and non-edible objects can be marked using the below described new and inventive method, where in a first step the object to be marked is formed to its final shape, except for its marking, whereupon in a second step the object is marked.

U.S. Pat. No. 3,410,699 (L. PETERS) discloses a method of and means for embossment and packaging of cold butter. Anyhow this patent concerns a method where the butter objects are punched from a blank to their final outer shapes thereby being simultaneously embossed. On the contrary in our invention the marking takes place separately from and after the shaping of the objects.

U.S. Pat. No. 3,410,699 (L. PETERS) discloses a plastic patty for shaping and ornamenting butter or margarine objects. Anyhow this patent concerns a molding process in which further the forming of the outer shape and the marking of the butter or margarine objects are made simultaneously. In our invention though no molding occurs and marking takes place separately from and after the shaping of the objects.

DE 2637519 (PETERS, LEO) discloses patties for molding butter or margarine. These patties are for use in a molding process in which the forming of the outer shape and the marking of the butter or margarine objects are made simultaneously. On the contrary in our invention no molding occurs and the marking takes place separately from and after the shaping of the objects.

U.S. Pat. No. 4,001,440 (HOYT) discloses a package for forming a stick-mounted frozen confection. This package is for molding and subsequent freezing of a material. Shaping and marking of the objects take place simultaneously. On the contrary in our invention neither molding nor freezing occurs and the marking takes place separately from and after the shaping of the objects.

The present invention is thus both novel and inventive over forming or marking methods and devices therefore, disclosed in U.S. Pat. No. 3,410,699, U.S. Pat. No. 3,410,699, DE 2637510 and U.S. Pat. No. 4,001,440.

OBJECTS OF THE INVENTION

The present invention provides for a novel and inventive method for marking objects and to objects being marked with such method. The invention is especially useful for marking solid or semi-solid formulations of drugs, candy and food-stuff. Specifically the invention is useful to mark nicotine-containing chewing gums. Other solid or semi-solid objects can equally well be marked using the present invention.

Accordingly, one object of the present invention is to provide a new method for marking objects.

A second object of the invention is objects, specifically nicotine-containing chewing gums, being marked with the above method.

Other objects of the invention will become apparent to one skilled in the art, and still other objects will become apparent hereinafter.

SUMMARY OF THE INVENTION

The present invention comprises a method for marking solid or semi-solid objects in which the object, previously formed to its final outer shape except for its marking, is placed in a package whereby a pattern in the package is caused, by e.g. pressing, to make a marking in the object. Very minor and non-important changes in the object's outer shape might occur during the marking process. The invention also comprises objects being marked with such a method.

DETAILED DESCRIPTION OF THE INVENTION

Figure 1:
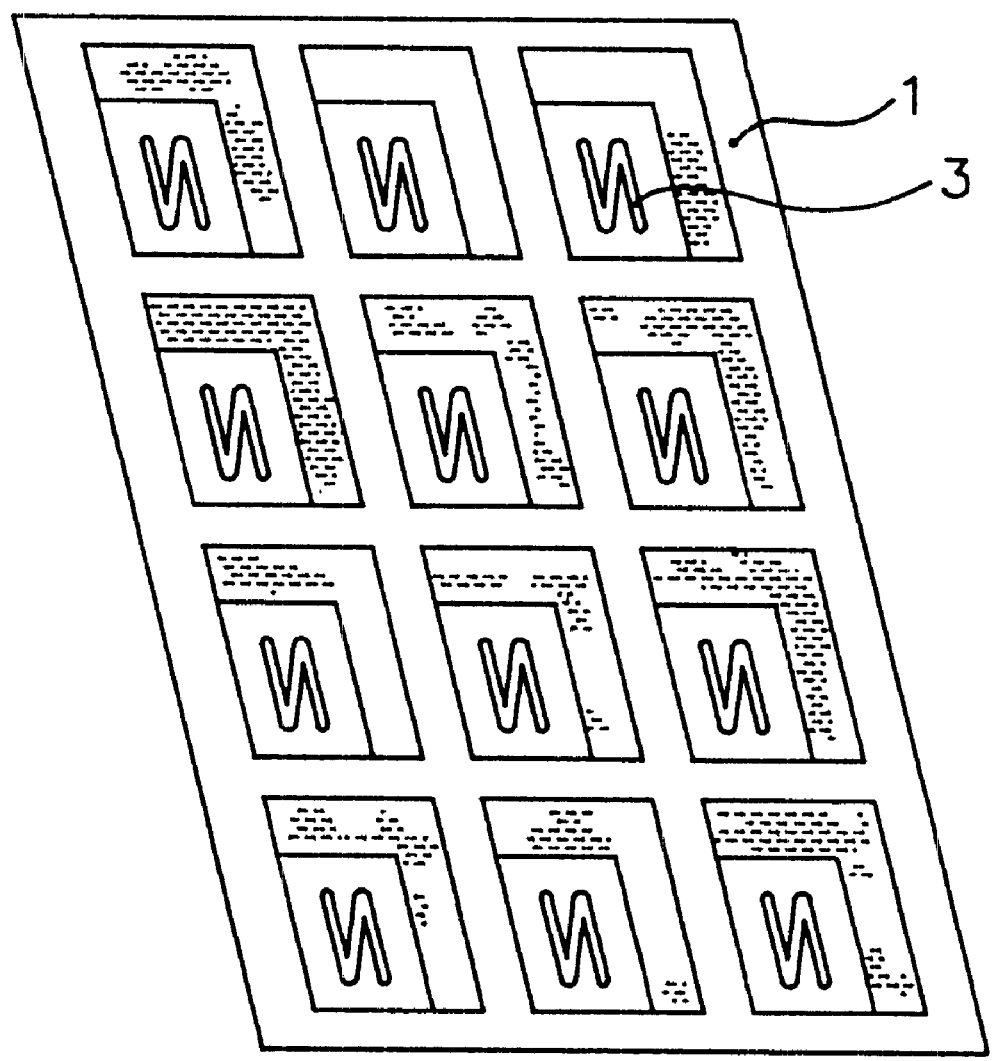
FIG. 1 is a schematic perspective view of the covering foil (1) of a blister package according to this invention for packing nicotine-containing chewing gums. The bottom foil of the blister package is here removed for clarity and is not shown in this figure. The pattern (3) to be impressed into the chewing gum is schematized as a capital N, seen inverted in this view. This pattern (3) is here an impression in the covering foil (1).
Figure 2:
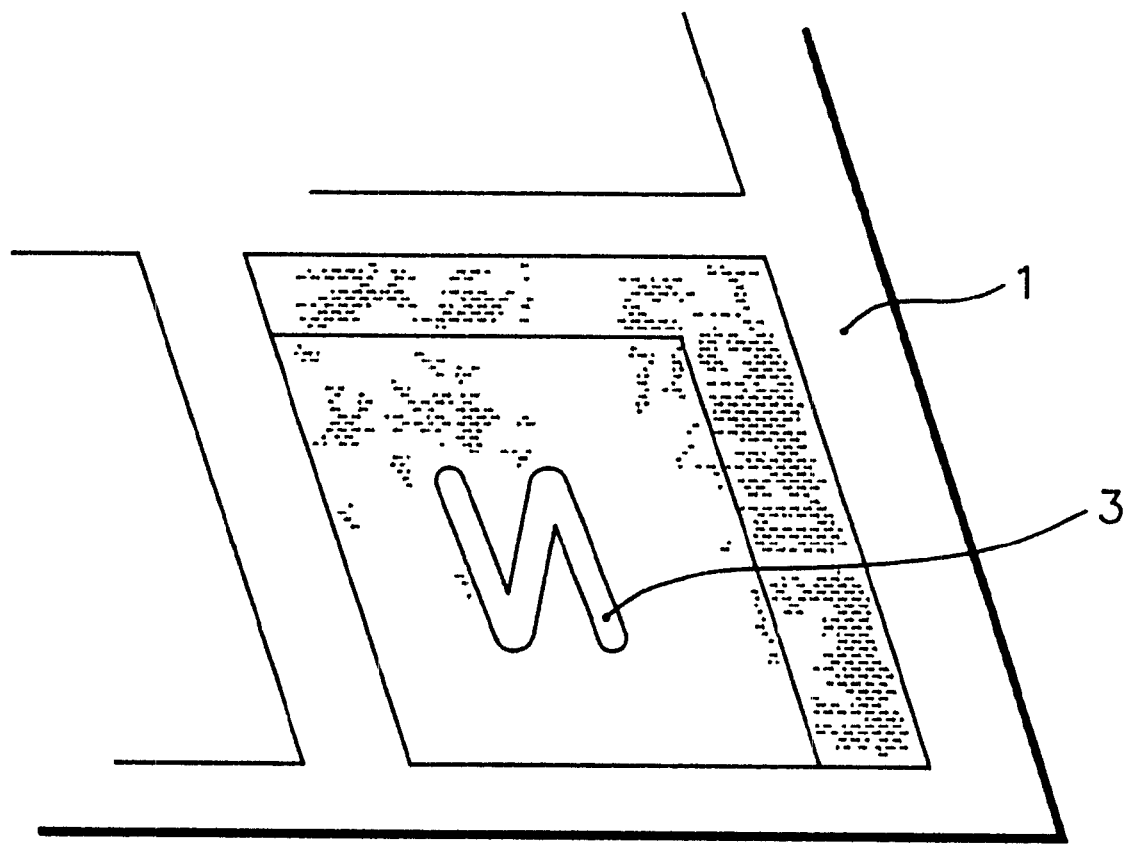
FIG. 2 is a detail from FIG. 1 showing the covering foil (1) for just one chewing gum.
Figure 3:
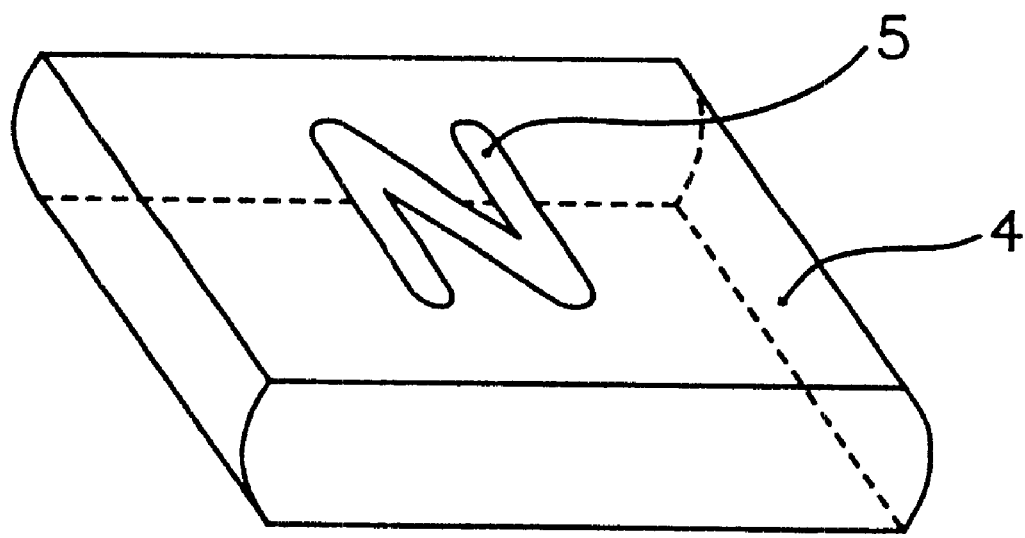
FIG. 3 schematically shows in perspective a nicotine-containing chewing gum (4) after having been packed in a blister package according to FIG. 1 and 2. The marking (5) made by the pattern (3) in the blister package is seen as a capital N. The marking (5) has here the form of an impression into the chewing gum (4).

The following examples are intended to illustrate but not to limit the scope of the invention, although the methods and objects described are of particular interest for the intended purposes.

EXAMPLE 1

Nicorette® nicotine-containing chewing gums (4) essentially according to U.S. Pat. No. 3,845,217 were manufactured, after mixing of the ingredients, essentially through extruding and subsequent cutting to final shapes. The gums essentially comprised chewing gum base, nicotine resin, buffering substances, sweeteners and flavouring additives. Covering foils (1) for blister packages were manufactured from 0.25 mm polyvinyl chloride foils coated with polyvinylidene chloride whereby depressions to house the gums (4) and patterns (3) in the form of impressions were made in these foils (1). The impressions had a depth of one or a few tenth of a millimeter. The radii of the impressions were large enough to avoid fracture indications in the covering foils (1). The chewing gums (4) were subsequently placed one by one in the covering foils (1). Each covering foil (1) housed 12 or 15 gums (4). Thereafter a bottom foil, made of 0.020 mm aluminium foil coated with heatseal lacquer, was rolled onto the covering foil (1) and air-tightly heat sealed thereon. The blister packages were so made that there were minimum space between the gums (4) and the covering (1) and bottom foils in order to minimize the amount of air surrounding the gums (4), the air causing slow degradation of the nicotine.

Before or after the above heat sealing the covering foil (1) and the bottom foil were pressed together whereby the pattern (3) was pressed into the gums (4) causing the desired marking (5) thereon, without any important changes of the shapes of the gums (4). It is not advisable to perform said pressing during the heat sealing operation as the heat would make the gums (4) stick to the foils. In the final package there remained very little space between the gums (4) and the covering foils (1) and the bottom foils respectively causing that as long as the gums (4) remained in the package at least part of the pattern (3) remained positioned in the marking (5) thereby guranteeing that the gums (4) did not resume their prior unmarked surface. When the gums (4) were taken out of the package the marking (5) anyhow remained stable and legible because the marking (5) already had become firm in the gum (4). Furthermore the gums (4) hardened somewhat when coming into contact with the air making the marking even more stable.

In this example the pattern (3)/marking (5) took the form of a simple capital N. More complex patterns, such as drug or company identifications, may also be used. As a chewing gum is a small object of course the pattern (3)/marking (5) may not be too detailed.

In the above example the packaging material did not stick to the the gums (4). Other suitable foil materials than aluminium foil, polyvinyl chloride and polyvinylidene chloride may also be used. If there is tendency of sticking between the gums (4) and the package the adherence may be reduced by eg dusting the gums (4) with talcum or starch prior to package.

EXAMPLE 2

This example is the same as Example 1 with the sole difference that preferably objects not being sensitive to heat are marked and that there is no pattern (3) in the covering foil (1) when the objects (4) are placed in the package. Instead the pattern (3), and simultaneously the resulting marking (5), is achieved through a subsequent stamping of the completed package. The method according to Example 2 has to be used with care as the stamping usually needs to be performed during heat which might degrade the objects being marked. Nicotine-containing chewing gums are therefore better marked using the method according to Example 1.

A number of embodiments of the present invention are envisageable within the inventive scope, e g the pattern (3) needs not remain in the marking (5) after the pressing operation, the pattern (3) may exist in the bottom foil instead or in both the covering foil (1) and the bottom foil, in order to produce markings (5) on different surface(s) or part(s) of the object (4), and a marking dye may prevail in the covering foil (1) and/or bottom foil being released into the marking (5) when the pattern (3) is pressed into the gums (4). A marking dye often spreads unacceptably much on an even surface, but very much less when in a recessed marking. Other packages than blister packages are envisageable. Above the objects (4) to be marked are chewing gums. Other objects (4) such as candy or food-stuff are also suitable to mark using the present invention. Also non-edible objects, preferably solid or semi-solid ones, may be marked using the above method.

Also other embodiments not mentioned above, but envisageable by the skilled man, are covered by the present invention.

What is claimed is:

1. A combination of a preformed, ingestible, impressible and incompletely marked object packaged in a blister package, said object being placed in and present in said package in substantially its final outer shape except for a predetermined intended final marking, said blister package having inner and outer surfaces, and a preformed pattern comprising a depression and/or a raising in a portion of the inner surface of said blister package, and wherein the preformed pattern comprises the shape of at least a portion of said predetermined intended final completed marking on the object, wherein the blister package is capable of being pressed against said object such that the preformed pattern is engageable at least temporarily with the object so that said pattern is pressable into said object to produce the completed marking on the object, and wherein the object is not molded into the object's final shape as the object is introduced into the blister package.

2. The packaged object according to claim 1, wherein the preformed pattern on the inner surface of the blister package is made in a part of the package which has a reduced tendency to adhere to the object.

3. The packaged object according to claim 2, wherein the reduced tendency to adhere is achieved by coating the object and/or package with an adherence-reducing material.

4. The packaged object according to claim 3, wherein the adherence-reducing material is talcum or starch.

5. The packaged object according to claim 1, wherein the blister package comprises metal foil and/or polymer foil.

6. The packaged object according to claim 5, wherein the metal foil is aluminum foil and the polymer foil is polyvinylidene chloride foil.

7. The packaged object according to claim 1, wherein the object is a drug, candy or food-stuff.

8. The packaged object according to claim 1, wherein the pattern on the package is so formed that the marking on the object is produced on more than one part or surface of the object.

9. The packaged object according to claim 1, wherein the package comprises a dye which is transferable from the pattern into the marking on the object.

10. A combination of an incompletely marked nicotine-containing chewing gum packaged in a blister package, said chewing gum being placed in and present in said package in substantially its final outer shape except for a predetermined intended final marking, said blister package having inner and outer surfaces, and a preformed pattern comprising a depression and/or a raising in a portion of the inner surface of said blister package, and wherein the preformed pattern comprises the shape of at least a portion of said predetermined intended final completed marking on the nicotine-containing chewing gum, and wherein the blister package is capable of being pressed against said nicotine-containing chewing gum such that the preformed pattern is engageable at least temporarily with the nicotine-containing chewing gum so that said pattern is pressable into said nicotine-containing chewing gum to produce the completed marking on the nicotine-containing chewing gum, and wherein the nicotine-containing chewing gum is not molded into the nicotine-containing chewing gum's final shape as the nicotine-containing chewing gum is introduced into the blister package.

11. The packaged nicotine-containing chewing gum according to claim 10, wherein the preformed pattern on the inner surface of the blister package is made in a part of the package which has a reduced tendency to adhere to the gum.

12. The packaged nicotine-containing chewing gum according to claim 11, wherein the reduced tendency to adhere is achieved by coating the gum and/or package with an adherence-reducing material.

13. The packaged nicotine-containing chewing gum according to claim 12, wherein the adherence-reducing material is talcum or starch.

14. The packaged nicotine-containing chewing gum according to claim 10, wherein the blister package comprises metal foil and/or polymer foil.

15. The packaged nicotine-containing chewing gum according to claim 14, wherein the metal foil is aluminum foil and the polymer foil is polyvinylidene chloride foil.

16. The packaged nicotine-containing chewing gum according to claim 10, wherein the pattern on the package is so formed that the marking on the gum is produced on more than one part or surface of the gum.

17. The packaged nicotine-containing chewing gum according to claim 10, wherein the package comprises a dye which is transferable from the pattern into the marking on the gum.

* * * * *